Patented Nov. 26, 1929

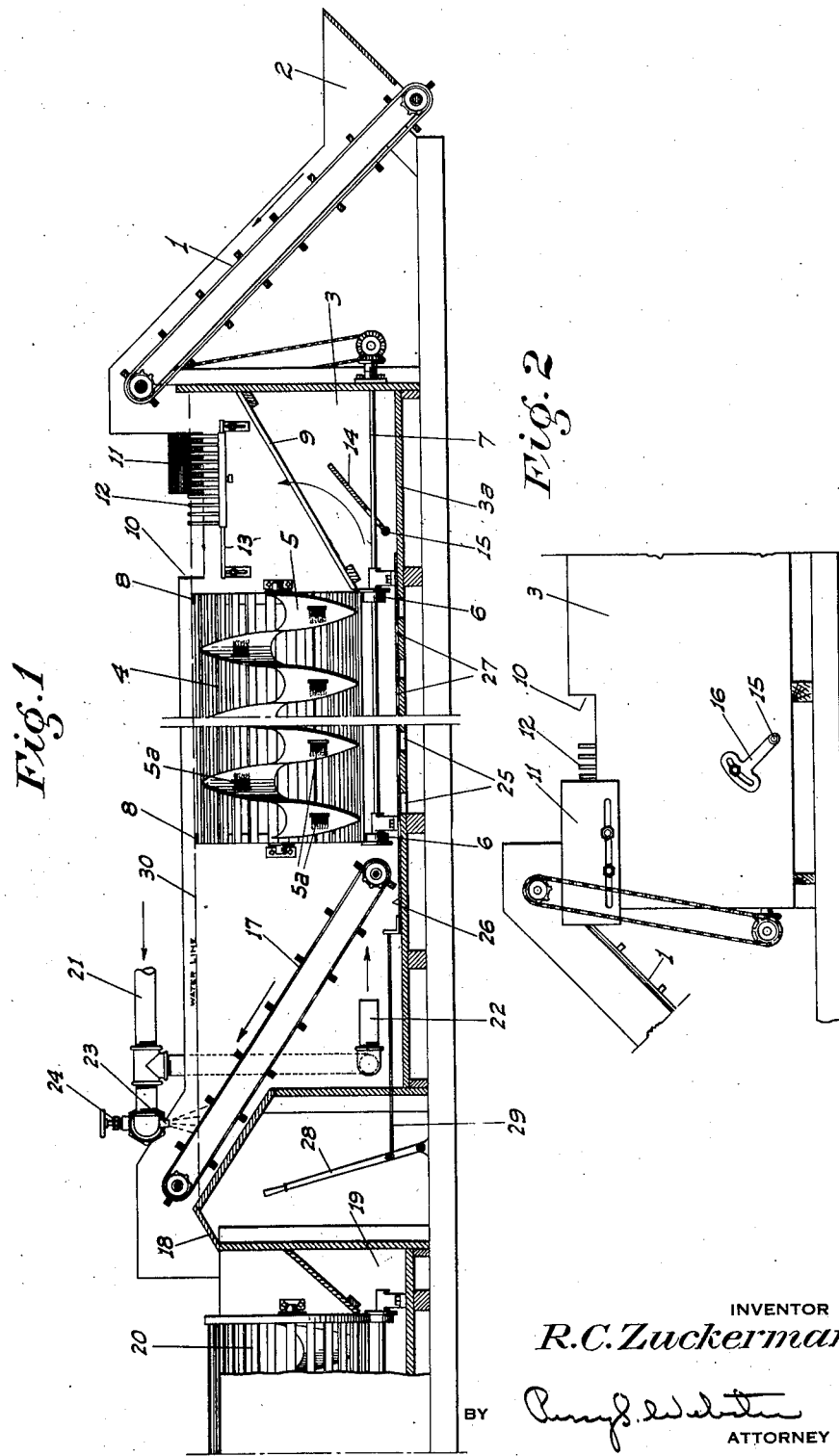

1,736,813

UNITED STATES PATENT OFFICE

ROSCOE C. ZUCKERMAN, OF STOCKTON, CALIFORNIA

POTATO CLEANER

Application filed February 10, 1926. Serial No. 87,223.

This invention relates to improvements in potato cleaning devices for mechanically removing any dirt caked on the potatoes and at the same time causing the potatoes to be washed and also for causing any floatable foreign matter with the potatoes to be separated from the same while they are undergoing the cleaning operation.

The device shown in the present invention particularly represents an improvement over the structure shown in my Patent No. 1,561,043 dated November 10th, 1925, and is especially designed to handle potatoes grown in peat land, the lumps of which are floatable. At the same time the structure is adequately adapted for use in efficiently cleaning potatoes no matter what the character of the dirt in which they are grown may be.

The principal object of the present invention is to provide a structure for the purpose which while operating on the same principle as the previous device, is of simpler construction with even greater cleaning efficiency. Other objects are to provide adjustable means for controlling the overflow of water used in the cleaning operations, depending on the volume of water available; and means for preventing the potatoes, the specific gravity of which is very low, from possibly being discharged from the overflow along with any dirt without however restricting the discharge of matter intended to be carried away.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a sectional elevation of my improved cleaning apparatus.

Fig. 2 is a fragmentary side elevation of the device taken in a direction opposite to that shown in Fig. 1.

Referring now more particularly to the characters of reference on the drawings, the numeral 1 denotes an endless driven conveyor of suitable character having an upward slant from its lower end. A hopper 2 at the lower end of the conveyor provides means for enabling the potatoes to be readily fed to the conveyor from the field.

The upper end of the conveyor discharges into the forward end of a tank 3 of any suitable dimensions. An open ended horizontal drum 4, whose sides are preferably made of spaced slats, is turnably mounted in the tank intermediate the ends of the same, the drum extending longitudinally of the tank. Mounted within the drum and extending from end to end and to the periphery thereof is a screw conveyor 5 of ordinary character. If desired brushes 5ᵃ may be mounted on the side faces of said conveyor to project outwardly therefrom.

The drum is arranged to be continuously rotated by means of rollers 6 mounted on a drive shaft 7 and which frictionally engage bands 8 about the drum at its ends. Similar idler rollers are mounted on the sides of the tank and engage the sides of the drum.

Between the lower forward end of the drum and the adjacent end of the tank a sloping chute or incline for the potatoes discharged into the tank is provided in the form of transversely spaced slats 9.

One side of the tank between the drum and the forward end of the tank is cut away somewhat as at 10 to form a water discharge outlet, the length of the outlet being adjustable as to size by means of a horizontally slidable and adjustable gate 11 mounted on the side of the tank.

A vertical grate bar unit 12 is mounted adjacent the outlet 10, the length of said unit being somewhat less than that of the outlet and the tops of the bars projecting some distance above the bottom of the outlet.

The grate is mounted for adjustment both vertically and longitudinally in a suitable manner, as for instance by means of a horizontal support 13 mounted on the adjacent side wall of the tank for vertical adjustment thereon, on which support the unit 12 is horizontally adjustable.

Disposed in the tank under the incline 9 is a deflector or baffle plate 14. This plate extends transversely of the tank at an upward and forward angle from its lower end. To enable the angle of the plate to be altered at will it is mounted on a shaft 15 which projects through the side of the tank and on the outside is mounted in connection with an adjustable arm 16 arranged to be turned and held clamped against movement from any desired position in which it may be set.

The rear end of the drum discharges at the bottom onto an endless conveyor 17 of suitable character. This conveyor slopes upwardly to a point beyond and above the rear end of the tank and discharges onto an apron 18 which leads to another tank 19 filled with a suitable sterilizing liquid. A revolving drum 20 the same construction as the drum 4 is mounted in the tank 19, the potatoes from the conveyor 17 passing into the forward end of the drum 20 and being discharged from the rear end thereof.

From the sterilizing tank the potatoes are mechanically conveyed to grading and sacking units. This feature however has been already shown in the above mentioned patent, and it is therefore unnecessary to illustrate the same in this application.

Mounted in connection with the tank 3 is a water intake pipe 21, the water being discharged into said tank in a horizontal and forward direction near the bottom and rear end thereof through a nozzle 22.

Connected to the pipe 21 and extending transversely of and above the conveyor 17 adjacent the rear end thereof and above the water level in the tank are rinsing spray nozzles 23, the water passing through said nozzles being controlled by a valve 24. The bottom 3ª of the tank 3 especially under the drum 4 is provided with a plurality of drain openings 25, which are normally covered by a longitudinally movable plate 26 having openings 27 to aline with the openings 25.

This plate is moved longitudinally so as to control the flush drain arrangement provided by the orificed plate and the orificed tank bottom by means of a lever 28 mounted at one end of the tank outside the same and connected to the adjacent end of the plate by a rod 29 extending through the tank.

In operation the water is allowed to continuously flow into the tank through the nozzle 22 and the gate 11 is adjusted, depending on the volume of water flowing into the tank, so that the water will flow through the outlet 10 in a continuous stream, while maintaining the level of water in the tank a certain distance above the bottom of the outlet, as indicated at 30. This is necessary in order to give sufficient depth of water in the outlet to permit of any floating lumps in the water to be carried through the outlet by such water.

The various conveyors and drum are then driven and a supply of potatoes is maintained in the hopper 2 so that the potatoes and any lumps of dirt which may be present with the same are discharged continuously into the tank.

The grate 12 is adjusted so as to allow any floatable lumps to readily pass through the outlet, while preventing any potatoes themselves from possibly passing through said outlet.

The lumps of dirt from the conveyor float on the water and as stated are instantly carried off by the water flowing through the outlet, which water is moved toward the outlet from the rear end of the tank. The potatoes fall onto the incline 9 down which they roll into the drum. While on the incline the potatoes are subjected to the direct forward flow of the water which, after moving lengthwise of the tank from the nozzle 22, is caught and deflected upwardly by the baffle 14. By altering the angle of setting of this baffle the intensity or force and the exact location of this upward flow of water can be altered. This current of water initially washes the potatoes, removing any loose dirt therefrom, and also tends to cause such dirt to be at once carried to the outlet.

The potatoes entering the revolving drum are carried to the rear end thereof by the screw conveyor therein, the potatoes being thus moved both longitudinally and laterally through the forward moving body of water. During this movement the potatoes are also tumbled over and over so that before discharging from the drum all sides of the potatoes will have been exposed to the flow of water. This tumbling also serves to loosen any dirt caked on the potatoes. The brushes 5ª engaging the potatoes with their tumbling action further loosen and remove dirt therefrom.

Since the water is continuously flowing lengthwise of the tank and through the open sided drum, all such dirt will be carried away from the potatoes so that when the latter are discharged from the drum they are in a thoroughly cleaned condition.

As the potatoes leave the drum they are caught by the conveyor 17 and raised out of the water. As they leave the water the potatoes are subjected to the rinsing sprays of clean water from the nozzles 23. This completes the washing process. Potatoes then enter the tank 19 and the drum therein. With the rotation of said drum the potatoes are moved through the drum and with such movement they are subjected to a thorough sterilizing action.

The dirt removed from the potatoes while they are in the drum 4 is acted on of course by the flow of water. Any of such dirt as may be floatable or nearly so is therefore conveyed by the water to the outlet 10 and discharged from the tank. The heavier dirt settles in the bottom of the tank under the drum and can be removed whenever necessary by opening the flush valve structure.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A potato cleaner including a tank to contain water and into the forward end of which the potatoes to be cleaned are discharged, means for conveying the potatoes along the tank to the rear end thereof, and at the same time causing the same to be cleaned, a foraminous incline in the tank leading to the front end of the conveying means and onto which the potatoes discharged into the tank are initially deposited, and means for setting up a flow of water lengthwise of the conveying means from the rear to the front end thereof, and then up through the foraminous incline.

2. A potato cleaner including a tank to contain water and into the forward end of which the potatoes to be cleaned are discharged, means for conveying the potatoes along the tank to the rear end thereof, and at the same time causing the same to be cleaned, a foraminous incline in the tank leading to the front end of the conveying means and onto which the potatoes discharged into the tank are initially deposited, means for setting up a flow of water lengthwise of the conveying means from the rear to the front end thereof, along the bottom of the tank, and a transverse and angularly adjustable deflector mounted under the incline and having an upward slant toward the front end of the tank.

3. A potato cleaner including a tank to contain water, a cleaning and conveying member in the tank, a foraminous incline sloping downwardly from the forward end of the tank to the adjacent end of said member and down which the potatoes pass to the cleaning member, means for setting up a current of water upwardly through the incline, and an outlet in the side of the tank above and in the longitudinal plane of the incline.

4. In a potato cleaner, a tank, a conveyor means to carry the potatoes into one end of the tank and out the other, means to subject the potatoes to an abrasive action while passing through the tank, a liquid inlet into the tank near the discharge end of the conveyor, a sluice way at the top edge of the opposite end of the tank, a normally closed flush valve in the bottom of the tank, and means to open and close the valve at will.

In testimony whereof I affix my signature.
ROSCOE C. ZUCKERMAN.